United States Patent Office 3,496,249
Patented Feb. 17, 1970

3,496,249
PREPARATION OF ASH-FREE LUBRICATING OIL ADDITIVES
Otto Hitzler and Ulrich Schödel, Darmstadt, Heinz Jost, Messel, and Ernst Koch, Traisa uber Darmstadt, Germany, assignors to Rohm & Haas G.m.b.H., Darmstadt, Germany
No Drawing. Filed Aug. 31, 1964, Ser. No. 393,401
Claims priority, application Germany, Aug. 22, 1963, R 35,960
Int. Cl. C08f 33/04; C10m 1/32
U.S. Cl. 260—836
20 Claims

ABSTRACT OF THE DISCLOSURE

A method of forming compounds useful as lubricating oil additives, and the compounds formed, by reacting an oil-soluble addition copolymer having 1-50 pendant reactive acid anhydride, epoxy, or isocyanato groups with an oleophobic polymer having at least one —NH— group therein, the —NH— group of said polymer being derived from a monomer component (e.g. as in a polyamide), or introduced into the polymer by polymerizing a monomer (e.g. N-vinyl pyrrolidone) in the presence of a chain transfer agent or accelerator having —NH— groups, or by at least partial reduction of nitrilo groups (i.e. polyacrylonitrile) to amino groups.

---

The present invention relates to a process for the preparation of certain ash-free lubricating oil additives soluble in lubricating oil and having a pronounced dispersant and detergent effect, and to the additives prepared.

Lubricating oil additives having dispersant and detergent effects are known in the art and their use has become indispensable in the high capacity motors under current use. Independent of the conditions under which the motors are employed, the use of unimproved oils leads to the deposition of solid products on metal surfaces coming into contact with the lubricating oil. At high temperatures, these deposits form crusts on the pistons, and at low temperatures they form a sludge in the oil pan. Both types of deposits are undesirable since they can cause failure of the motor even after only a short period of operation. The damaging deposits arise not only from fuel-derived partially oxidized hydrocarbons present in the exhaust gases, but also from oxidation of the lubricating oil.

The purpose of lubricating oil additives having a dispersant and detergent effect is to deter the formation of such solid deposits. At first, metal-organic compounds were principally employed as detergents. These do show a detergent effect and hinder the deposition of solids at high temperatures. However, in stop-and-go traffic the materials often have an insufficient dispersant action.

Ash-free additives having a dispersant and detergent effect are also known in the art. Oil-soluble copolymers prepared by the copolymerization of nitrogenous monomeric compounds with nitrogen free unsaturated compounds are used as ash-free additives for multi-purpose oils. They show an outstanding dispersant capability, but do not show a satisfactory detergent effect when employed in diesel motors. Lubricating oils containing this type of ash-free additive must, for this reason, have still other detergents added when these oils are to be employed in diesel motors.

The lubricating oil additives prepared according to the present invention show not only a very good dispersant effect but also an outstanding detergent effect in diesel motors. They are prepared by the bonding of (1) oil-soluble polymers containing reactive groups with (2) oleophobic oligomeric or macromolecular compounds containing (a) cyclic or acyclic acid acid amide groups, (b) amino groups in which the nitrogen atom is exclusively in a side chain and/or (c) nitrile groups, and which contain at least one functional group for reaction with the reactive groups present in the oil-soluble polymer.

The reactive oil-soluble polymers used in the present invention suitably have a molecular weight of from $10^3$ to $5(10^6)$. They are synthesized from polymers or copolymers of mono- and/or diesters of $\alpha,\beta$-unsaturated lower aliphatic carboxylic acids (for example esters of acrylic acid, methacrylic acid, fumaric acid, maleic acid), in which esters the alcohol portion contains from 8 to 18 carbon atoms, and/or from polymers and copolymers of olefins having from 2 to 5 carbon atoms. Polyisobutylene and the polymethacrylic acid ester of coconut fatty alcohols are particularly suitable materials of this type. The polymerization of the $\alpha,\beta$-unsaturated carboxylic acid esters, or the polymerization of the olefins, proceeds according to solution, emulsion, suspension, or bulk polymerization processes known to the skilled polymer chemist. Solution polymerizations are most advantageous.

Reactive groups such as anhydride, epoxy, isocyanate, or imino groups can be incorporated into the oil-soluble polymers just described, or into the oleophobic polymers with which the oil-soluble materials are reacted according to the invention. For the purposes of bonding the two polymers, it is immaterial which of the polymers contains which of the two reactive groups to be reacted with one another.

The reactive groups can be introduced into the parent polymer in several different ways. For the oil-soluble polymers of esters of $\alpha,\beta$-unsaturated acids, one can suitably proceed by copolymerizing the $\alpha,\beta$-unsaturated monomer with a monomer containing a reactive group. For example, esters of acrylic acid, methacrylic acid, and/or maleic acid are polymerized with materials such as maleic acid anhydride or itaconic acid anhydride, with glycidyl acrylate, glycidyl methacrylate, vinyl glycidyl ether, vinyl isocyanate, $\beta$-isocyanato ethyl acrylate, $\beta$-isocyanato ethyl methacrylate, methacrylaziridine, acrylaziridine, and the like. The number of reactive groups in the oil-soluble polymer is suitably from 1 to 50 per macromolecule.

Particularly suitable polymers of this type are the copolymers formed between acrylate and methacrylate esters of the $C_8$–$C_{18}$ alcohols and maleic acid anhydride, glycidyl methacrylate, or isocyanato ethyl methacrylate. Such copolymers, which conveniently have a molecular weight of about 300,000, include, for example, copolymers comprising 99.9 percent by weight of cetyl methacrylate and 0.1 percent of maleic acid anhydride, or 99.75 percent by weight of cetyl methacrylate and 0.25 percent of isocyanato ethyl methacrylate, or 99.8 percent by weight of cetyl methacrylate and 0.2 percent of glycidyl methacrylate. These polymers all have from 1 to 50 reactive groups per molecule.

In place of cetyl methacrylate, the maleic acid or fumaric acid esters of lorol alcohols can be used. (Lorol alcohols are commercial mixtures of $C_{12}$ to $C_{18}$ fatty alcohols.)

The reactive compounds can also be introduced into the materials of the invention by addition to polymers containing double bonds. For example, maleic acid anhydride may be added to a coploymer containing oleyl methacrylate, or may be added to terminal double bonds present in other polymers at the conclusion of polymerization. The addition of maleic acid anhydride to polyolefins has already been described by K. Alder et al. [Bericht der Deutschen Chemischen Gesellschaft, 76, 27 (1943)], and in U.S. Patent 3,018,250. For the present invention, adducts formed between maleic acid anhydride and polypropylene or polyisobutylene having a molecular weight between 1000 and 10,000 are particularly useful.

The oleophobic oligomeric or macromolecular compounds which are reacted with the oil-soluble polymers just described according to the present invention suitably have a molecular weight of 500 to 50,000. They can be prepared by addition or condensation polymerization and contain, as already described, (a) cyclic or acyclic acid amide groups, (b) amino groups whose nitrogen is exclusively in a side chain, and/or (c) nitrile groups. Oligomeric or polymeric compounds of type (a) include, for example, aliphatic polyamides and polymers of N-vinyl-substituted cyclic acid amides such as N-vinyl pyrrolidone or N-vinyl pyrrolidone whose hydrogen atoms are completely or partially substituted by alkyl groups. The polyamides are prepared according to conventional methods from dicarboxylic acids having 6 to 10 carbon atoms, or from their derivatives, and from diamines having 2 to 6 carbon atoms. For example, they may be formed from adipic acid dimethyl ester and ethylene diamine, or from ε-aminocaprolactam, or by the addition polymerization of acrylic acid amide or methacrylic acid amide.

The compounds of type (b) include oligomers and polymers of olefinically unsaturated compounds having an amino group in the side chain, such as acrylic acid amino alkyl esters and methacrylic acid amino alkyl esters in which one or both N-hydrogen atoms may be substituted by aliphatic, carbocyclic or heterocyclic radicals. For example, the group includes polymers of dimethyl amino ethyl acrylate or of dimethyl amino methyl methacrylate or of 1-(β-methacrylyloxethyl)-2-methyl-Δ²-imidazoline.

Group (c) includes materials such as polyacrylonitrile and polymethacrylonitrile, in which the nitrile groups may be partially reduced to amino groups, or copolymers of these nitriles with the monomers of groups (a) or (b).

For the oleophobic oligomers or polymers just described, the group necessary for reaction with the reactive group of the oil-soluble polymer component may be an end group whose introduction into the molecule is conveniently effected by oligomerization or polymerization of a monomer in the presence of suitable regulators and/or polymerization accelerators. For example, N-vinyl pyrrolidone can be polymerized in the presence of N-dialkyl amino alkyl amines, especially γ-dimethyl-amino-n-propylamine, and α,α'-azo isobutyric acid dinitrile. The amine acts both as a solvent and as a chain transfer agent introducing amino groups into the polymer in a manner discussed for example in the paper of Bamford et al., Trans. Faraday Soc., 54, No. 2, 268 (1958) and op. cit. 52, No. 5, 716 (1956). Components containing reactive amino groups can also be prepared by the copolymerization of monomers such as vinyl pyrrolidone with a small amount of acrylonitrile (mol proportion about 10:1 to 40:1), followed by partial or complete reduction of the nitrile groups to amino groups.

The reaction of the oil-soluble component with the oleophobic component most conveniently proceeds by heating the two materials dispersed in solution or suspension. The mole ratio of the monomers employed for the preparation of the oil-soluble component to the monomers which are employed for the preparation of the oleophobic component is suitably between 3 to 1 and 30 to 1. As the solvent or dispersant, aliphatic and aromatic hydrocarbons or oxygenated hydrocarbons are suitable, such as benzene, dioxane, or mineral oil. The nature of the dispersant is not critical, since it serves only as an inert medium for the reactants but does not itself react. The dispersed (e.g. dissolved) reactants are suitably heated to temperatures between about 50° C. and 200° C. until the desired yield of reaction product is obtained.

A better understanding of the invention and of its many advantages will be had by referring to the following specific examples, given by way of illustration.

Example 1

10 parts of N-vinyl pyrrolidone were dissolved in 90 parts of γ-dimethylamino-n-propylamine and were polymerized over a period of 24 hours with one part of azo di-isobutyronitrile at 80° C. under a nitrogen atmosphere.

After the polymerization, the γ-dimethylamino-n-propylamine was removed under vacuum at 90° C. to isolate the reaction product.

For preparation of a detergent additive, 20 gms. of this reaction product were dissolved in 200 ml. of dioxane. This solution was added over a period of one hour to 50 ml. of a dioxane solution of 100 gms. of a copolymer formed between 99.8 percent by weight of a lauryl-stearyl-methacrylate mixture and 0.2 percent of maleic acid anhydride (40% in mineral oil). Subsequently, the mixture was heated for 20 hours at 100° C. and unreacted materials were then separated by centrifugation.

The detergent-additive was obtained from the dioxane solution by distilling off the dioxane.

3% of a 40% solution of the preparation in mineral oil gave a piston rating of 79 points. In comparison, a copolymer of 89.3 percent by weight of the lauryl-stearyl-methacrylate mixture with 10.7 percent of vinyl pyrrolidone gave only 72 points when tested by the MWM-motor oil Test A reported in Erdöl und Kohle, 12, 484–487 (1959). The point valuation scheme employed is that of Kruppke, op. cit. pp. 490–494.

Example 2

97 parts by weight of N-vinyl-2-pyrrolidone were copolymerized with 3 parts by weight of acrylonitrile (30% aqueous solution) in the presence of one part by weight of azo di-isobutyronitrile by stirring at 80° C. under a nitrogen atmosphere.

The cloudy solution of polymer was then hydrogenated at 60° C. under 175 atmospheres of hydrogen after the addition of 8 parts by weight of ammonia and 10 parts by weight of Raney cobalt (50% Co, 50% Al). The solution was then clarified by centrifugation and the ammonia was removed by boiling. A sample freed from water had an acetyl number of 15.2 milligrams KOH per gram, η sp./c.=0.015 at 20° in water.

30 parts by weight of the aqueous solution were then reacted with 250 parts by weight of the copolymer solution of Example 1 (copolymer of laurylstearyl methylmethacrylate mixture comprising 0.2 percent by weight of maleic acid anhydride, all as a 40 percent solution in mineral oil). The reaction proceeded as in Example 1, and water was subsequently freed by heating.

3% of a 40% solution of this preparation in mineral oil gave a piston rating of 77 points in the MWM-motor oil Test A, while a copolymer of laurylstearyl methacrylate mixture with 10.7 percent by weight of vinyl pyrrolidone gave only 72 points.

Example 3

500 parts by weight of polyisobutylene (MW 3000) were heated with 100 parts by weight of maleic acid anhydride for 15 hours at 200° C. with stirring. Excess maleic acid anhydride was removed by sublimation in vacuum. The resulting polyisobutenyl-succinic acid anhydride having an hydrolysis number of 36 mg. KOH per gram was reacted at 150° C. in 500 grams of mineral oil with 200 parts by weight of a polyamide prepared by heating ethylene diamine and adipic acid dimethyl ester in a mol ratio of 1:1. The polyamide had an amine number of 35 mg. HCl per gm. The product was subsequently purified by centrifugation. N-content: 1.58% by weight after precipitation of a sample with benzene-isopropanol.

3% of a 40% solution of this preparation in mineral oil gave a piston rating of 81 points in the MWM-motor oil Test A, whereas a copolymer of laurylstearyl methacrylate mixture with 10.7% of vinyl pyrrolidone rated only 72 points.

Example 4

85 parts by weight of a 2:1 molar mixture of lauryl methacrylate and octadecyl methacrylate, 9 parts by weight of methacrylic acid methyl ester, and 6 parts by weight of itaconic acid anhydride were copolymerized in 100 parts by weight of mineral oil with 0.8 part by weight of t-butyl perbenzoate at 110°. The polymerization product, $\eta$ sp./c.=0.04 measured in n-butylacetate at 23° C. was then refluxed and stirred for 24 hours in 80 parts by weight of methylene chloride with 20 parts by weight of polycaprolactam. The polylactam had been prepared by the polymerization of $\epsilon$-caprolactam at 250° C. in the presence of 0.025 mol of $\epsilon$-caprolactam hydrochloride per mol of caprolactam as a catalyst [cf. Rothe, Makromoleculare Chemie, 54 183 (1962)]. The material was subsequently treated with a basic ion exchanger to remove HCl and was then washed out with water. It had an amine number of 7.3 mg. of HCl per gram.

The methyl chloride was then removed from the product and the product was heated for another 5 hours at 150° C. and purified by centrifugation (N-content: 0.9% by weight).

3% of a 40% solution of the preparation in mineral oil gave a piston rating of 70 points in the MWM-motor oil Test A, while a copolymer of a mixed laurylstearyl methacrylate with 10.7% of vinyl pyrrolidone only gave 72 points.

Example 5

80 parts by weight of N-vinyl-2-pyrrolidone were dissolved in 120 parts by weight of water-free benzene. After addition of 2 parts by weight of $\beta$-aminoethane thiol and 2 parts by weight of azo di-isobutyric acid dinitrile, the monomer was polymerized for 15 hours at 80° C. in a nitrogen atmosphere. The polymer was then isolated by distillative removal of the solvent and the unreacted N-vinyl pyrrolidone at 150° C. at 0.2 mm. Hg. Yield: 65% (calculated on the N-vinyl-2-pyrrolidone used). $\eta$ sp./c.=0.003 (20° C. in water).

A copolymer of dodecyl methacrylate with 0.09 milliequivalents per gram of $\beta$-isocyanato-ethyl methacrylate was prepared as taught in the article of R. K. Graham in J. Polymer Science 24, 367 (1957). 100 parts by weight of this copolymer were then reacted with 10 parts by weight of the above-mentioned polyvinyl pyrrolidone in 100 parts by weight of water-free benzene. Unreacted polyvinyl pyrrolidone was extracted with water. Then the benzene was removed by distillation in vacuum and a 40% solution of the reaction product in lubricating oil was prepared. The nitrogen content of the solution was 0.84%.

Other copolymers suitable for use according to the invention and containing isocyanate groups derived from vinyl isocyanate, isopropenyl isocyanate, p-isocyanato styrene, allyl isocyanate, and isocyanato alkyl vinyl ether are described by R. K. Graham in J. Polymer Science 24, 367 (1957), and can be substituted for the isocyanato copolymer described above. Copolymers suitable for use in the invention and containing epoxy groups are taught in the article of J. A. Simms, J. App. Polym. Sci., 5 58 (1961).

Example 6

100 parts by weight of a copolymer, prepared from 99.9 parts by weight of maleic acid esters of fatty alcohols having an average of 14 carbon atoms and 0.1 part by weight of vinyl glycidyl ether by polymerization with azo di-isobutyric acid dinitrile in dioxane solution, were reacted with 10 parts by weight of a polyvinyl pyrrolidone polymer prepared according to Example 5 in 100 parts by weight of dioxane at 100° C. for 50 hours. The reaction product was isolated by pouring into water, and was then dissolved in mineral oil to give a 40% solution. The solution contained 0.46% of nitrogen.

What is claimed is:

1. A process for preparing an oil-soluble product which comprises reacting (A) an oil-soluble polymer having a molecular weight from $10^3$ to $5(10^6)$ selected from the group consisting of (1) addition copolymers, formed by addition across a double bond, of (a) an ester of an $\alpha,\beta$-unsaturated carboxylic acid and a fatty alcohol having from 8 to 18 carbon atoms, and (b) an amount of a comonomer selected from the group consisting of olefinically unsaturated acid anhydrides, epoxides, and isocyanates such that the resulting copolymer contains from 1 to 50 reactive groups derived from said comonomer per molecule, and (2) copolymers which are adducts formed between a polyolefin having unsaturated olefinic bonds therein and an anhydride of an unsaturated dicarboxylic acid; with (B) an oleophobic polymer having a molecular weight from 50 to 50,000 and at least one —NH— group reactive with an anhydride, epoxy, or isocyanato group of said oil-soluble polymer, said oleophobic polymer being selected from the group consisting of (1) aliphatic polyamides containing repeating carbonamide groups as an integral part of the polymer backbone and (2) addition homopolymers and copolymers, formed by addition across a double bond, of monoethylenically unsaturated compounds selected from the group consisting of (a) N-vinyl pyrrolidone, (b) an alkyl-substituted N-vinyl pyrrolidone, (c) acrylonitrile, (d) methacrylonitrile, (e) alkyl amino acrylates and methacrylates in which at least one hydrogen atom of the amino group may be hydrocarbon-substituted, (f) acrylamide, and (g) methacrylamide, by dissolving or dispersing said polymers (A) and (B) in an inert organic solvent or dispersant and heating to a temperature between about 50° C. and 200° C., the molar ratio of the monomer content of said oil-soluble copolymer (A) to the monomer content of said oleophobic polymer (B) being between 3:1 and 30:1.

2. A process as in claim 1 wherein said oil-soluble polymer is a addition copolymer of an ester formed between a higher fatty alcohol and an $\alpha,\beta$-unsaturated carboxylic acid and a comonomer selected from the group consisting of olefinically unsaturated acid anhydrides, epoxides, and isocyanates.

3. A process as in claim 1 wherein said oil-soluble polymer is an adduct formed between a polyolefin having unsaturated olefinic bonds therein and an anhydride of an unsaturated dicarboxylic acid.

4. A process as in claim 1 wherein said oil-soluble polymer is a addition copolymer of a methacrylic acid ester of an aliphatic alcohol having 8 to 18 carbon atoms, and a comonomer selected from the group consisting of maleic acid anhydride, itaconic acid anhydride, glycidyl acrylate, glycidyl methacrylate, $\beta$-isocyanato ethyl acrylate, and $\beta$-isocyanato ethyl methacrylate.

5. A process as in claim 1 wherein said oleophobic polymer is an addition polymer prepared in the presence of a chain transfer agent or accelerator having —NH— groups.

6. A process as in claim 1 wherein said oleophobic polymer is an addition polymer comprising nitrilo groups at least partially reduced to amino groups.

7. A process as in claim 1 wherein said oleophobic polymer is an aliphatic polyamide containing repeating carbonamide groups as an integral part of the polymer backbone.

8. A compound prepared by the method of claim 5.
9. A compound prepared by the method of claim 6.
10. A compound prepared by the method of claim 7.
11. A compound prepared by the method of claim 1.
12. A process which comprises condensing (A) an oil-soluble polymer prepared by reacting (1) an acrylate or methacrylate ester of an alcohol having from 8 to 18 carbon atoms with (2) an olefinically unsaturated isocyanato compound selected from the group consisting of $\beta$-isocyanato-ethyl methacrylate, vinyl isocyanate, isopropenyl isocyanate, p-isocyanato styrene, allyl isocyanate, and isocyanato alkyl vinyl ether in amounts such that from 1 to 50 isocyanato groups are present in the resulting copolymer molecule, with (B) poly(N-vinyl-2-pyrrolidone), the molar ratio of the monomer content of copolymer (A) to the monomer content of copolymer (B) being between 3:1 and 30:1.

13. A compound prepared by the method of claim 12.

14. A process which comprises condensing (A) an oil-soluble polymer prepared by reacting (1) polyisobutylene having a molecular weight of from about 3000 to about 6000 with (2) sufficient maleic anhydride to introduce from 1 to 50 anhydride groups into said polyisobutylene, with (B) an equivalent amount of an oleophobic polyamide prepared from equivalent amounts of ethylene diamine and adipic acid dimethyl ester, said polyamide having a degree of condensation between about 10 and about 20.

15. A process which comprises condensing (A) an oil-soluble polymer prepared by reacting (1) from 50 to 1000 molar parts of a mixture of methacrylate esters of higher aliphatic alcohols having 12 to 15 carbon atoms with (2) 1 molar part of a member selected from the group consisting of maleic acid anhydride and itaconic acid anhydride, with an equivalent amount of (B) an oleophobic polymer of N-vinyl pyrrolidone.

16. A process as in claim 15 wherein said oleophobic polymer is a homopolymer of N-vinyl pyrrolidone having —NH— groups introduced into terminal portions of said polymer by polymerization of monomeric N-vinyl pyrrolidone in the presence of a chain transfer agent or accelerator having —NH— groups.

17. A process as in claim 15 wherein said oleophobic polymer is a copolymer of (1) 10 to 40 molar parts of N-vinyl pyrrolidone with (2) 1 molar part of acrylonitrile, wherein at least a portion of the nitrilo groups in said copolymer are subsequently reduced to amino groups.

18. A compound prepared by the method of claim 14.
19. A compound prepared by the method of claim 16.
20. A compound prepared by the method of claim 17.

References Cited

UNITED STATES PATENTS

| | | | |
|---|---|---|---|
| 2,723,248 | 11/1955 | Wright | 260—895 |
| 2,901,457 | 8/1959 | Stoner | 260—895 |
| 2,935,484 | 5/1960 | Arnold | 260—895 |
| 3,283,033 | 11/1966 | Johnson | 260—897 |
| 3,236,914 | 2/1966 | Murdock | 260—857 |
| 3,256,233 | 6/1966 | Hahn | 260—898 |
| 2,557,808 | 6/1951 | Walker | 260—857 |

FOREIGN PATENTS 637,646  3/1962  Canada.

MURRAY TILLMAN, Primary Examiner

PAUL LIEBERMAN, Assistant Examiner

U.S. Cl. X.R.

252—51.5; 260—77.5, 78.5, 85.5, 86.1, 88.3, 94.8, 830, 857, 858, 859, 895, 896, 897, 898, 901